(12) United States Patent
Corbitt et al.

(10) Patent No.: US 6,420,977 B1
(45) Date of Patent: Jul. 16, 2002

(54) VIDEO-MONITORING SAFETY SYSTEMS AND METHODS

(75) Inventors: Timothy W. Corbitt, Berlin; William S. Passman, Lexington, both of MA (US)

(73) Assignee: BBNT Solutions LLC, Cambridge, MA (US)

( * ) Notice: Subject to any disclaimer, the term of this patent is extended or adjusted under 35 U.S.C. 154(b) by 0 days.

(21) Appl. No.: 09/557,194

(22) Filed: Apr. 21, 2000

(51) Int. Cl.[7] ............................................... G08G 1/017
(52) U.S. Cl. ........................ 340/937; 340/426; 340/435; 340/933; 348/333.13
(58) Field of Search ................................. 340/937, 435, 340/426, 539, 933; 348/333.01, 333.13, 142, 147, 149, 159, 49

(56) References Cited

U.S. PATENT DOCUMENTS

| | | | | |
|---|---|---|---|---|
| 4,937,665 A | * | 6/1990 | Schiffman | 358/103 |
| 5,198,895 A | * | 3/1993 | Vick | 358/103 |
| 5,283,573 A | * | 2/1994 | Takaton et al. | 340/937 |
| 5,343,237 A | | 8/1994 | Morimoto | 348/143 |
| 5,396,429 A | * | 3/1995 | Hanchett | 364/436 |
| 5,559,496 A | * | 9/1996 | Dubats | 340/539 |
| 5,729,213 A | * | 3/1998 | Farrari et al. | 340/901 |
| 5,781,243 A | * | 7/1998 | Kormos | 358/556 |
| 5,793,880 A | * | 8/1998 | Constant | 382/100 |
| 5,926,210 A | * | 7/1999 | Hackett et al. | 358/158 |
| 6,081,206 A | * | 6/2000 | Kielland | 340/937 |
| 6,163,755 A | * | 12/2000 | Peer et al. | 701/301 |

* cited by examiner

Primary Examiner—Jeffrey Hofsass
Assistant Examiner—Phung Nguyen
(74) Attorney, Agent, or Firm—Leonard Charles Suchyta; James K. Weixel

(57) ABSTRACT

A system facilitates visual monitoring of a dangerous location. The system includes a stationary camera device (110) and at least one mobile display device (120) corresponding to at least one vehicle. The camera device (110) captures a video image of the dangerous location and transmits video signals representative of the captured video image. The display device (120) receives the video signals from the camera device (110) when the corresponding vehicle is in proximity to the camera device (110) and presents the video signals as a video image of the dangerous location to a driver of the vehicle.

11 Claims, 5 Drawing Sheets

VIDEO-MONITORING SAFETY SYSTEMS AND METHODS

BACKGROUND OF THE INVENTION

A. Field of the Invention

The present invention relates generally to safety systems and, more particularly, to systems and methods that present a simple and easily deployable mechanism that provides visual information regarding locations, such as dangerous intersections, blind corners or curves, railroad crossings, etc., to drivers of vehicles to reduce the occurrence of accidents.

B. Description of Related Art

There are thousands of locations across the country that pose a danger to drivers of vehicles, such as cars, buses, trucks, trains, and the like. Many of these locations contain warning signs, such as "Hidden Driveway," "Blind Curve," "Railroad Crossing," and the like, to warn drivers of the potential dangers. These locations may also contain some type of warning signal, such as a flashing light or an audible alarm. Nevertheless, accidents continue to occur at these locations.

The reasons for the accidents vary. Drivers may enter the location at such excessive speeds that they cannot stop in time to avoid an obstacle in their course. Alternatively, the warning systems become obstructed in some manner. For example, weather conditions may prevent the drivers from seeing and/or hearing the warnings or the warning systems themselves may fail and, as a result, the drivers become unaware of the potential dangers. In some instances, accidents occur because drivers simply ignore the warning signs.

Therefore, there exists a need for a warning system that warns drivers of actual danger at any location that may be considered dangerous.

SUMMARY OF THE INVENTION

Systems and methods consistent with the present invention address this need by providing a simple and easy-to-use mechanism that sends visual information regarding dangerous locations to drivers of vehicles in proximity to the dangerous locations prior to the drivers reaching the locations so that they may react appropriately to avoid an accident.

In accordance with the purpose of the invention as embodied and broadly described herein, a system facilitates visual monitoring of a dangerous location. The system includes a stationary camera device and at least one mobile display device corresponding to at least one vehicle. The camera device captures a video image of the dangerous location and transmits video signals representative of the captured video image. The display device receives the video signals from the camera device when the corresponding vehicle is in proximity to the camera device and presents the video signals as a video image of the dangerous location to a driver of the vehicle.

In another implementation consistent with the present invention, a system includes multiple camera devices corresponding to multiple dangerous locations and at least one mobile display device corresponding to at least one vehicle. Each of the camera devices captures a video image of the corresponding dangerous location and transmits video signals representative of the captured video image. The display device receives the video signals from each of the camera devices when the corresponding vehicle is in proximity to the camera device and presents the video signals as a video image of the corresponding dangerous location to a driver of the vehicle.

In yet another implementation consistent with the present invention, a method for visually monitoring a dangerous location includes capturing video images of different views corresponding to the dangerous location by multiple camera devices; transmitting video signals representative of the different views on a corresponding number of different communication channels; receiving the video signals from a first one of the communication channels by at least one first mobile display device, corresponding to at least one first type of vehicle, when the corresponding first type of vehicle is in proximity to a corresponding one of the camera devices and presenting the video signals as a video image corresponding to the dangerous location to a driver of the first type of vehicle; and receiving the video signals from a second one of the communication channels by at least one second mobile display device, corresponding to at least one second type of vehicle, when the corresponding second type of vehicle is in proximity to a corresponding one of the camera devices and presenting the video signals as a video image corresponding to the dangerous location to a driver of the second type of vehicle.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention provide a simple and easily deployable mechanism that supplies early visual warnings to drivers of vehicles of actual dangers at various locations when the vehicles are in proximity to the locations to reduce the occurrence of accidents.

Exemplary System

Figure 1:
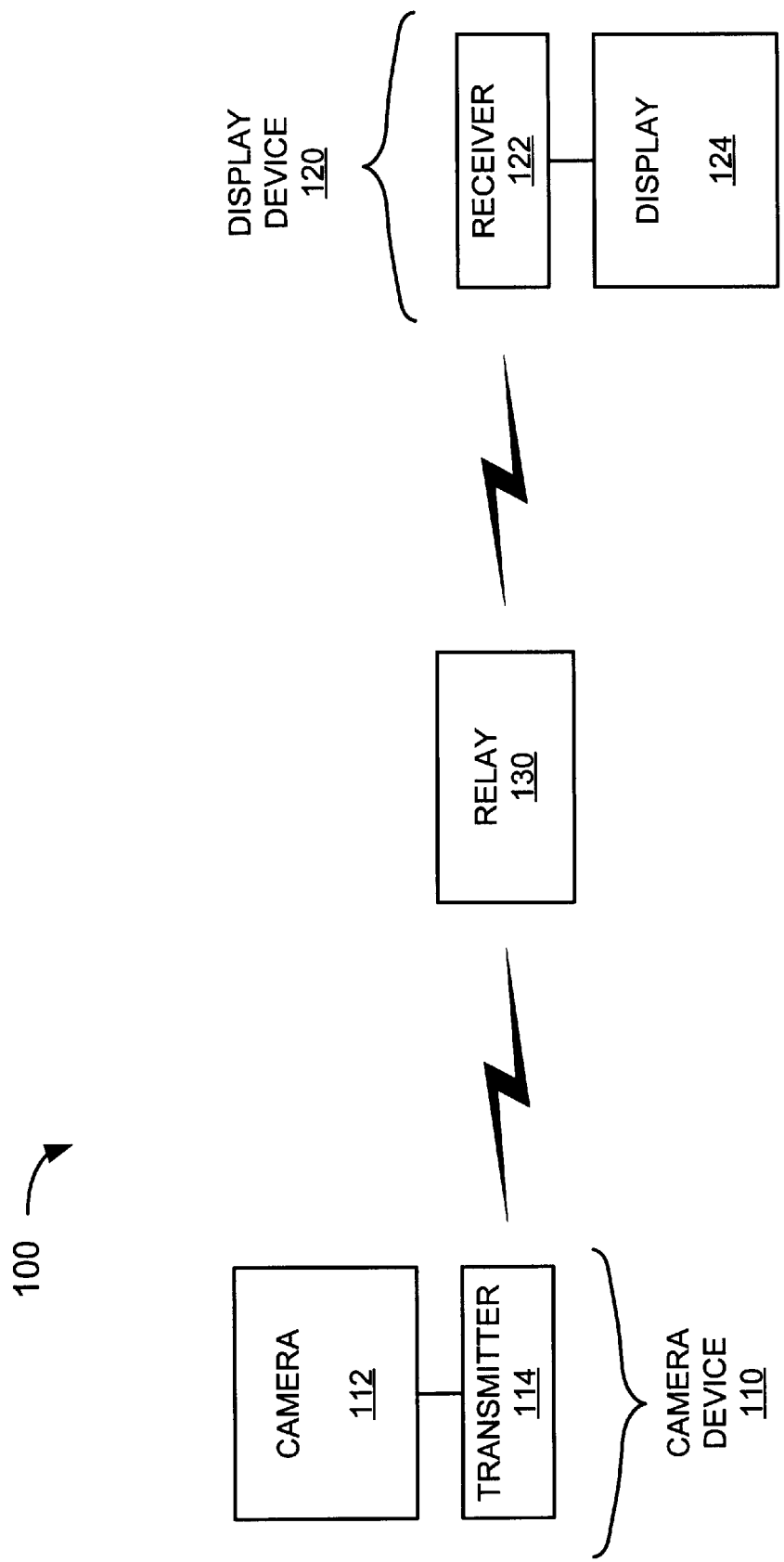
FIG. 1 is a diagram of an exemplary monitoring system consistent with the present invention.

FIG. 1 is an exemplary diagram of a monitoring system 100 consistent with the present invention. The system 100 includes at least two separate components: a camera device 110 and a display device 120. The camera device 110 may be a stationary device located at a predetermined location. The camera device 110 includes a camera 112 and a transmitter 114. The camera 112 may include a conventional security camera with night vision capability. The night vision capability permits the camera to capture video during inclement weather and at night. The transmitter 114 may include a conventional radio transmitter capable of transmitting at limited distances. The transmitter 114 receives video signals from the camera 112 and transmits them, as radio signals, on a predetermined radio channel to any display device 120 within its range.

If topological conditions prevent the transmitter 114 from transmitting the radio signals a sufficient distance, a relay 130 may be used. The relay 130 may include one or more conventional radio relays that receive the radio signals from the transmitter 114 and retransmit them using conventional retransmission technology.

The display device 120 may be located in a vehicle, such as an automobile, a bus, a truck, a train, etc. The display device 120 includes a receiver 122 and a display 124. The receiver 122 may include a conventional radio receiver tuned to the radio channel used by the transmitter 114. In at least one implementation consistent with the present invention, the receiver 122 is tunable by an operator to different radio channels. The receiver 122 receives the radio signals from the transmitter 114 and sends them to the display 124. The display 124 may include a conventional liquid crystal display (LCD) or a projection-type display that presents the video signals from the camera 112 to a driver of the vehicle.

Figure 2:
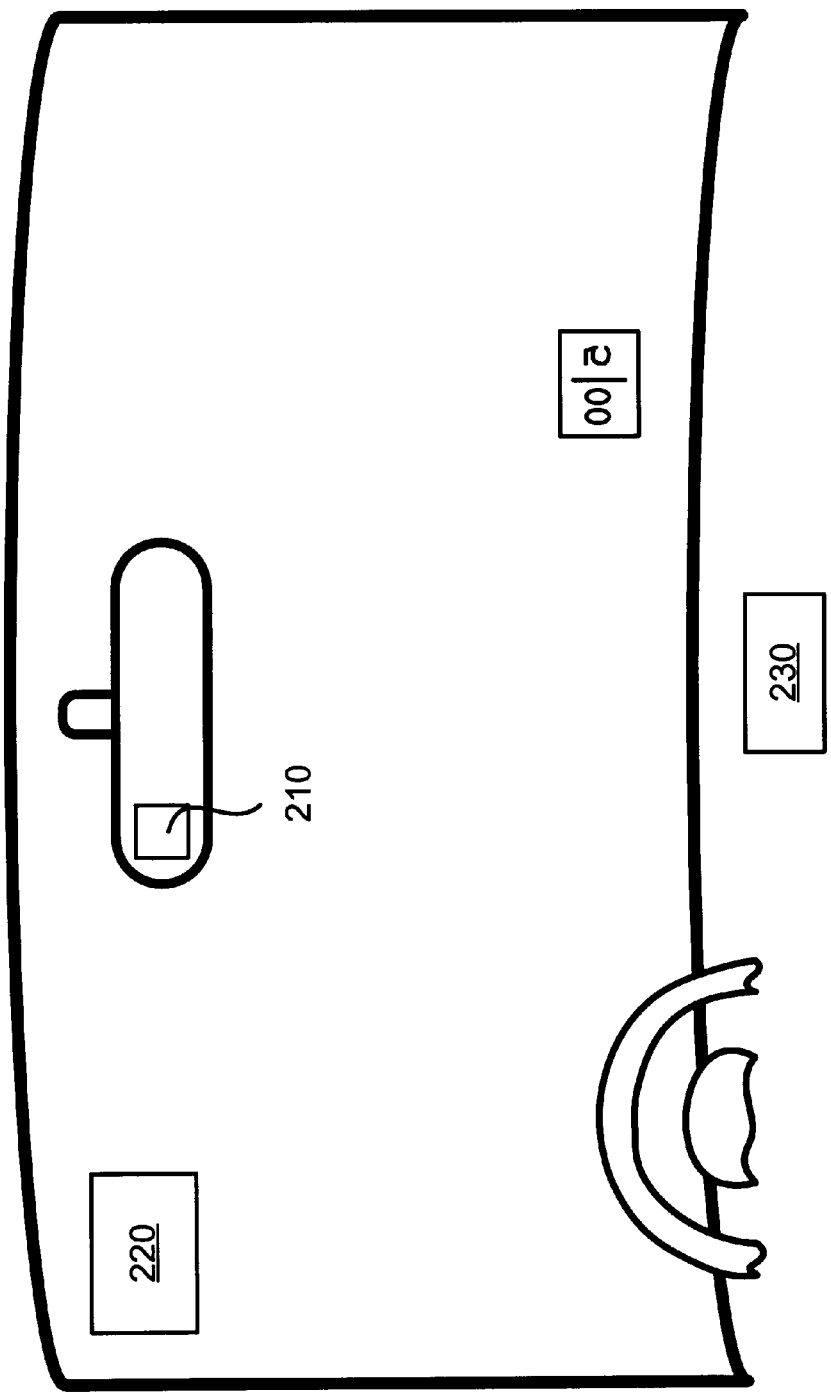
FIG. 2 is an exemplary diagram of possible displays that may be located in a vehicle.

FIG. 2 is an exemplary diagram of possible displays 210–230 that may be located in a vehicle. The display 210 includes a small LCD integrated in a rear view mirror. The display 220 includes a projection-type display that projects an image onto the windshield of the vehicle. One example of a projection-type display is Night Vision used in 2000 Cadillac automobiles. The display 230 includes an LCD integrated into or affixed to the dashboard of the vehicle. One of ordinary skill in the art would recognize that other types of displays may also be possible.

Exemplary Blind Curve

Figure 3:
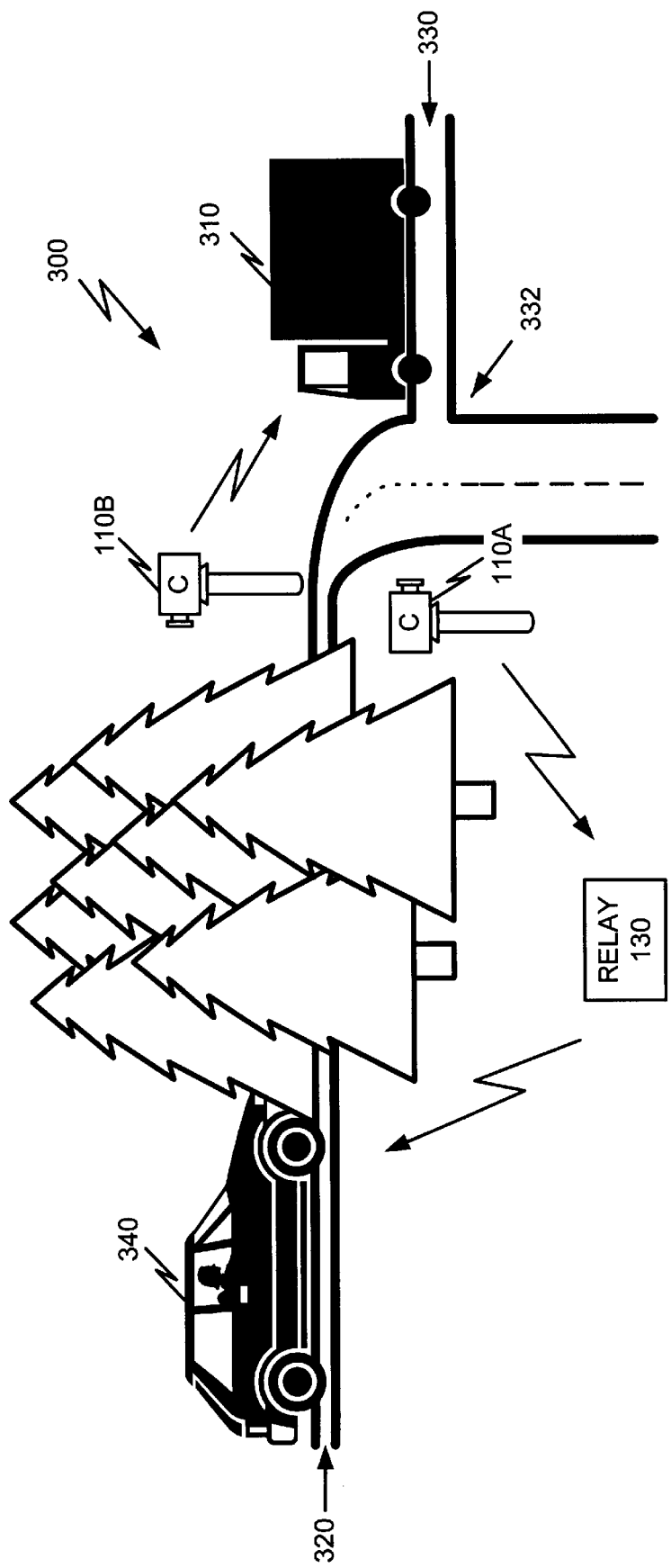
FIG. 3 is a diagram of an exemplary location at which systems and methods consistent with the present invention may be implemented.

FIG. 3 is a diagram of an exemplary location 300 at which systems and methods consistent with the present invention may be implemented. The location 300 is an example of a blind curve. At the location 300, a camera device 110 may be placed in one of several possible positions based on where the greater potential danger lies, or multiple camera devices 110 may be placed in multiple positions.

For example, if a potential danger results from vehicles, such as slow-moving truck 310, entering the main roadway 320 at a blind curve from an adjacent roadway 330, then the camera device 110A may be used. In this case, the camera device 110A constantly captures video images of the location of the intersection 332 at which the slow-moving truck 310 may enter the main roadway 320. The camera device 110A continuously transmits video signals to display devices (not shown) of oncoming vehicles, such as automobile 340, possibly via a relay 130. In this way, drivers of oncoming vehicles can determine whether to slow down or stop if a vehicle enters the main roadway 320 from the adjacent roadway 330.

If vehicles, such as automobile 340, travelling on the main roadway 320 pose a threat of danger, then the camera device 110B may be used. In this case, the camera device 110B constantly captures video images of the main roadway 320 to notify vehicles, such as the slow-moving truck 310, at the intersection 332 of the presence of an oncoming vehicle. The camera device 110B continuously transmits video signals to display devices (not shown) in vehicles at the intersection 332. In this way, drivers of vehicles at the intersection 332 can determine whether it is safe to enter the main roadway 320.

If both camera devices 110A and 1100B are used, the camera devices 110A and 110B transmit video signals on different radio channels. Road signs, visual indicators, such as text descriptions, used by the display devices, or other mechanisms, may be used to inform the drivers of the radio channel to which to tune.

Two examples of possible camera device positions have been described. One of ordinary skill in the art would recognize that other positions may also be possible.

Exemplary Railroad Crossing

Figure 4:
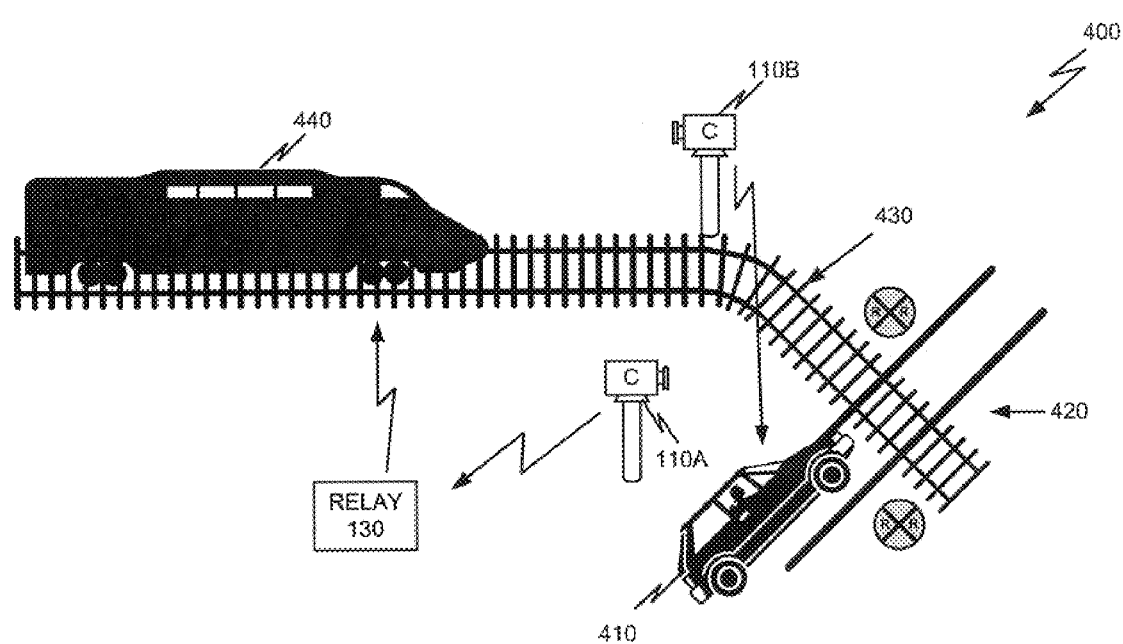
FIG. 4 is a diagram of another exemplary location at which systems and methods consistent with the present invention may be implemented.

FIG. 4 is a diagram of another exemplary location 400 at which systems and methods consistent with the present invention may be implemented. The location 400 is an example of a railroad crossing. At the location 400, a camera device 110 may be placed in one of several possible positions based on where the greater potential danger lies, or multiple camera devices 110 may be placed in multiple positions.

For example, if a potential danger results from vehicles, such as automobile 410, entering the railroad crossing 420, then the camera device 110A may be used. In this case, the camera device 110A constantly captures video images of the railroad crossing 420 to identify objects, such as vehicles, pedestrians, and animals, that may stop upon the railroad tracks 430. The camera device 110A continuously transmits video signals to display devices (not shown) of oncoming trains, such as train 440, possibly via a relay 130. In this way, train engineers can determine in advance whether to slow down or stop the train if an object rests upon the railroad tracks 430.

If trains, such as train 440, travelling on the railroad tracks 430 pose a threat of danger, then the camera device 110B may be used. In this case, the camera device 110B constantly captures video images of the railroad tracks 430 to notify vehicles, such as the automobile 410, at the railroad crossing 420 of the presence of an oncoming train. The camera device 110B continuously transmits video signals to display devices (not shown) in vehicles at the railroad crossing 420. In this way, drivers of vehicles at the railroad crossing 420 can determine whether it is safe to cross the railroad tracks 430.

If both cameras 110A and 110B are used, the camera devices 110A and 110B transmit video signals on different radio channels. For example, one channel may be used for transmission to trains and another channel for transmission to vehicles using the roadway.

Two examples of possible camera device positions have been described. One of ordinary skill in the art would recognize that other positions may also be possible.

Exemplary System Processing

Figure 5:
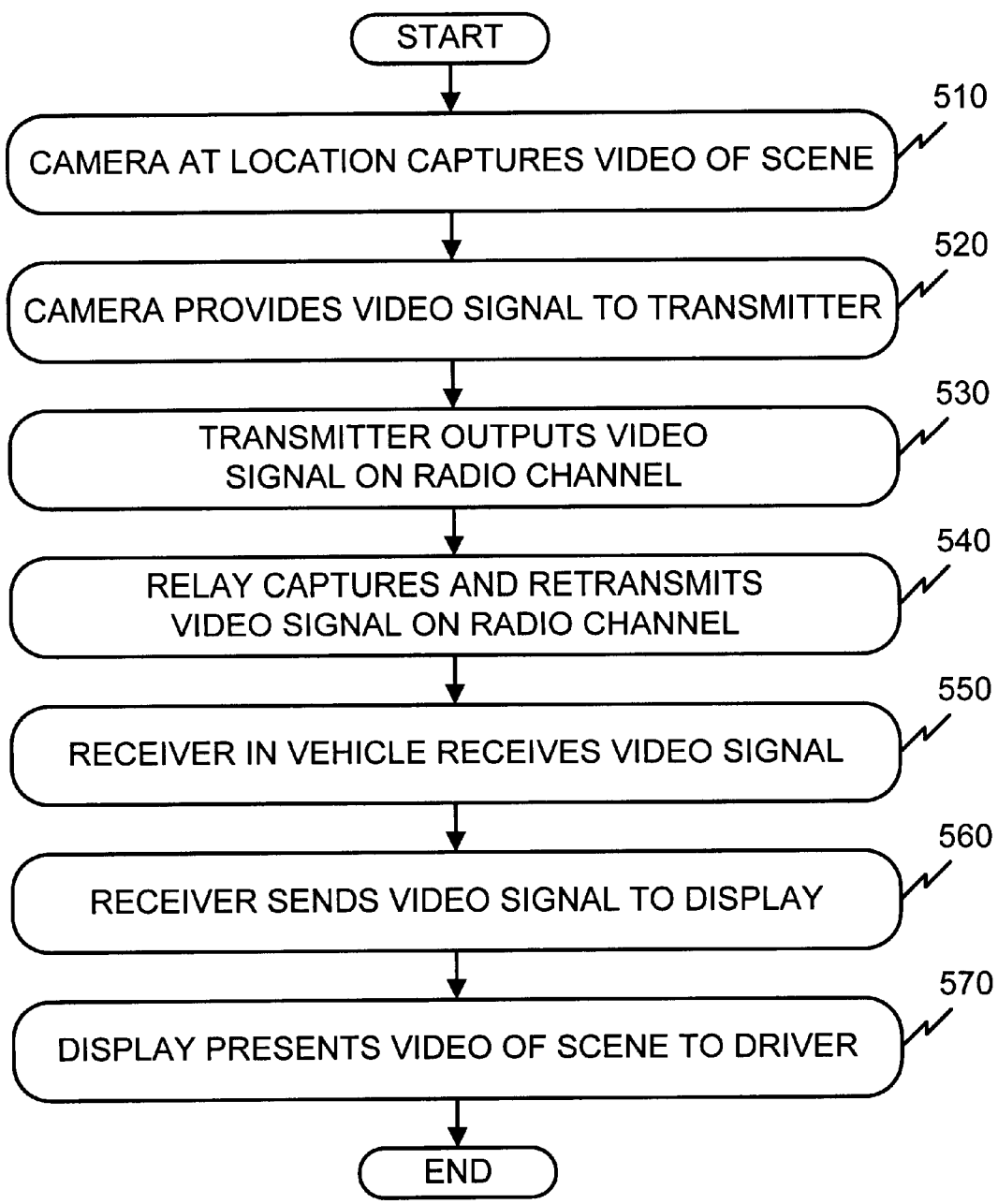
FIG. 5 is a flowchart of processing for monitoring a location in a manner consistent with the present invention.

FIG. 5 is a flowchart of processing for monitoring a dangerous location in a manner consistent with the present invention. Before the processing occurs, a camera device, such as camera device 110 (FIG. 1), is positioned at a predetermined location, such as at a blind curve, a dangerous intersection, a railroad crossing, etc. Also, vehicles, such as automobiles, trains, buses, trucks, and the like, may be pre-equipped with a display device, such as display device 120. The display device 120 is tuned, automatically or manually, to the radio channel used by the transmitter 114 of the camera device 110 to receive the video signals captured by the camera 112.

The camera 112 constantly captures video images of the location [step 510]. The camera 112 provides video signals representing the captured video images to the transmitter 114 [step 520], which outputs them as radio signals on a predetermined radio channel [step 530]. If topological conditions inhibit transmission of the video signals to a sufficient distance, a radio relay 130 may capture and retransmit the video signals using conventional retransmission technology [step 540].

A receiver 122 of a display device 120 in a vehicle within the proximity of the camera device 110 receives the video signals from the transmitter 114 [step 550]. The receiver 122 provides the video signals to the display 124 [step 560]. The display 124 presents the video signals to a driver of the vehicle to alert the driver of actual dangers at the location [step 570]. In this way, the driver can adjust his/her driving based on actual or potential dangers at the location.

Conclusion

Systems and methods consistent with the present invention provide drivers of vehicles with prior visual information of dangerous locations so that the drivers can adjust their driving to prevent accidents even when the locations are outside the line-of-sight of the drivers, during inclement weather, and at night.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while two exemplary locations have been described with regard to FIGS. 3 and 4, systems and methods consistent with the present invention equally apply to any location that may be considered dangerous.

Further, it may be possible to place many camera devices 110 at many different, remote locations. In this case, each of the camera devices 110 may transmit on the same radio channel to limited distances. As a result, when a driver comes within proximity to one of these locations, the display device 120 presents the driver with a visual image of the location. The display device 120 may provide a textual description of the location whose image is being captured. For example, the display device 120 might present a textual description, such as "Dead Man's Curve, Mile 117, Route 1" or "Railroad Crossing on Main Street near Route A1A" on the display. When the driver eventually leaves the vicinity of the camera device 110, the display device 120 may present a blank display or perhaps an advertisement to the driver.

In addition, the preceding description described the camera device 110 as transmitting video signals to the display device 120 using radio transmission technology. In another implementation consistent with the present invention, the camera device 110 transmits the video signals to a satellite that receives and retransmits the signals to the display device 120. In this case, the relay 130 of FIG. 1 may include a conventional satellite.

Also, the camera device 110 has been described as constantly capturing video images of a location and continuously transmitting video signals representative of the captured video images. This need not be the case, however. The camera device 110 may capture the video images at periodic intervals. Because activity at the location may constantly change, it may be important for the intervals to be very close together.

Further, systems and methods have been described in which only video images of various locations are captured. In an alternative implementation consistent with the present invention, audio signals are also captured and transmitted to the display device for presentation to the driver of the vehicle.

The scope of the invention is defined by the claims and their equivalents.

What is claimed is:

1. A system for visually monitoring a plurality of dangerous street locations, comprising:

a plurality of camera devices corresponding to the dangerous street locations, each of the camera devices being configured to capture a video image of the corresponding dangerous street location and transmit video signals representative of the captured video image; and at least one mobile display device, corresponding to at least one vehicle operable on a street, configured to receive the video signals from each of the camera devices when the corresponding street vehicle is in proximity to the camera device and present the video signals as a video image of the corresponding dangerous street location to a driver of the street vehicle.

2. The system of claim 1, wherein each of the camera devices includes:

a camera configured to capture the video image of the corresponding dangerous street location, and a radio transmitter configured to transmit the video signals as radio signals on a predetermined radio channel.

3. The system of claim 2, wherein the radio transmitter in each of the camera devices transmits video signals on the same predetermined radio channel.

4. The system of claim 2, wherein the display device includes:

a radio receiver tuned to the predetermined radio channel to receive the video signals.

5. The system of claim 1, wherein the display device includes at least one of a liquid crystal display and a projection-type display.

6. A system for visually monitoring a dangerous location, comprising:

a plurality of camera devices configured to capture different video images corresponding to the dangerous location and transmit video signals representative of the captured video images, each of the camera devices being configured to transmit the video signals on different communication channels;

at least one first mobile display device, corresponding to at least one first vehicle, configured to receive the video signals from a first one of the communication channels when the corresponding first vehicle is in proximity to a corresponding one of the camera devices and present the video signals as a video image corresponding to the dangerous location to a driver of the first vehicle; and at least one second mobile display device, corresponding to at least one second vehicle, configured to receive the video signals from a second one of the communication channels when the corresponding second vehicle is in proximity to a corresponding one of the camera devices and present the video signals as a video image corresponding to the dangerous location to a driver of the second vehicle.

7. A method for visually monitoring a dangerous location, comprising:

capturing video images of different views corresponding to the dangerous location by a plurality of camera devices;

transmitting video signals representative of the different views on a corresponding plurality of different communication channels;

receiving the video signals from a first one of the communication channels by at least one first mobile display device, corresponding to at least one first vehicle, when the corresponding first vehicle is in proximity to a corresponding one of the camera devices and presenting the video signals as a video image corresponding to the dangerous location to a driver of the first vehicle; and receiving the video signals from a second one of the communication channels by at least one second mobile display device, corresponding to at least one second vehicle, when the corresponding second vehicle is in proximity to a corresponding one of the camera devices and presenting the video signals as a video image corresponding to the dangerous location to a driver of the second vehicle.

8. A system for visually monitoring a dangerous location, comprising:

a plurality of camera devices configured to capture video images corresponding to the dangerous location and transmit video signals representative of the captured video images, each of the camera devices being configured to transmit the video signals on different communication channels; and at least one mobile display device, corresponding to at least one vehicle, configured to:

tune to one of the communication channels, receive the video signals on the one communication channel when the vehicle is in proximity to a corresponding one of the camera devices, and present the video signals as a video image corresponding to the dangerous location to an occupant of the vehicle.

9. The system of claim 8, wherein when tuning to the one communication channel, the at least one mobile display device is configured to receive input from an occupant of the vehicle.

10. The system of claim 8, wherein when presenting the video signals to the occupant of the vehicle, the at least one mobile display device is configured to provide a textual description of the dangerous location.

11. A monitoring device within an automobile, comprising:

a receiver configured to receive video signals on different communication channels from a plurality of camera devices when the automobile is in proximity to the camera devices, each of the camera devices capturing video images of one or more corresponding dangerous locations;

at least one user control configured to permit an occupant of the automobile to tune to one of the communication channels; and a display device configured to present the video signals corresponding to the one communication channel as a video image of the corresponding dangerous location to a driver of the automobile.

* * * * *